(12) United States Patent
Jiang et al.

(10) Patent No.: US 10,386,934 B2
(45) Date of Patent: Aug. 20, 2019

(54) GESTURE OPERATION METHOD BASED ON DEPTH VALUES AND SYSTEM THEREOF

(71) Applicant: METAL INDUSTRIES RESEARCH & DEVELOPMENT CENTRE, Kaohsiung (TW)

(72) Inventors: Jinn-Feng Jiang, Kaohsiung (TW); Shih-Chun Hsu, Kaohsiung (TW); Tsu-Kun Chang, Kaohsiung (TW); Tsung-Han Lee, Kaohsiung (TW); Hung-Yuan Wei, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 18 days.

(21) Appl. No.: 15/788,944

(22) Filed: Oct. 20, 2017

(65) Prior Publication Data

US 2018/0129296 A1  May 10, 2018

(30) Foreign Application Priority Data

Nov. 10, 2016 (TW) .............................. 105136594 A (51) Int. Cl.
*G06T 7/00* (2017.01)
*G06F 3/01* (2006.01)
(Continued)

(52) U.S. Cl.
CPC ............ *G06F 3/017* (2013.01); *G06F 3/0304* (2013.01); *G06K 9/00335* (2013.01);
(Continued)

(58) Field of Classification Search
CPC ............... H04N 13/254; H04N 13/239; H04N 2013/0081; G06F 3/017; G06F 3/0304; G06T 7/292; G06T 7/521; G06T 7/596; G06T 2207/10021; G06T 2207/20221; G06T 2207/30268; G06K 9/00335; G06K 9/00355; G06K 9/00389; G06K 9/00832; G06K 9/00845; G06K 9/6223; G06K 9/6297; G06K 2209/40; G06K 2209/401
See application file for complete search history.

(56) References Cited

U.S. PATENT DOCUMENTS

2009/0324008 A1\* 12/2009 Kongqiao ............... G06F 3/017
382/103
2014/0152551 A1\* 6/2014 Mueller .................. G06F 3/017
345/156
(Continued)

FOREIGN PATENT DOCUMENTS

TW 201419087 A 5/2014
TW 201514544 A 4/2015

*Primary Examiner* — Ping Y Hsieh
(74) *Attorney, Agent, or Firm* — Rosenberg, Klein & Lee (57) ABSTRACT

A gesture operation method based on depth values and the system thereof are revealed. A stereoscopic-image camera module acquires a first stereoscopic image. Then an algorithm is performed to judge if the first stereoscopic image includes a triggering gesture. Then the stereoscopic-image camera module acquires a second stereoscopic image. Another algorithm is performed to judge if the second stereoscopic image includes a command gesture for performing the corresponding operation of the command gesture.

10 Claims, 10 Drawing Sheets

(51) Int. Cl.
*G06T 7/292* (2017.01)
*G06T 7/521* (2017.01)
*G06T 7/593* (2017.01)
*H04N 13/254* (2018.01)
*G06K 9/00* (2006.01)
*G06K 9/62* (2006.01)
*G06F 3/03* (2006.01)
*H04N 13/239* (2018.01)
*H04N 13/00* (2018.01)

(52) U.S. Cl.
CPC ..... *G06K 9/00355* (2013.01); *G06K 9/00389* (2013.01); *G06K 9/00832* (2013.01); *G06K 9/00845* (2013.01); *G06K 9/6223* (2013.01); *G06K 9/6297* (2013.01); *G06T 7/292* (2017.01); *G06T 7/521* (2017.01); *G06T 7/596* (2017.01); *H04N 13/239* (2018.05); *H04N 13/254* (2018.05); *G06K 2209/40* (2013.01); *G06K 2209/401* (2013.01); *G06T 2207/10021* (2013.01); *G06T 2207/20221* (2013.01); *G06T 2207/30268* (2013.01); *H04N 2013/0081* (2013.01)

(56) References Cited

U.S. PATENT DOCUMENTS

2016/0091978 A1 3/2016 Park
2018/0091798 A1* 3/2018 Chang .................. H04N 13/271

* cited by examiner

GESTURE OPERATION METHOD BASED ON DEPTH VALUES AND SYSTEM THEREOF

FIELD OF THE INVENTION

The present invention relates generally to a gesture operation method, and particularly to a gesture operation method based on depth values, in which operations can be performed by recognizing the operational gestures in the depth values of a stereoscopic image acquired by a mobile vehicle.

BACKGROUND OF THE INVENTION

Cars are the most common mobile vehicles for modern families. Car vendors introduce various new models; consumers also weed out old cars gradually. After replacing old cars with new ones, consumers may further purchase electronic subsystems, such as GPS systems, tire-pressure monitoring systems, car multimedia equipment, dashboard cameras, and head-up displays, for mobile vehicle, enabling the huge consumer market. Manufacturers of electronic equipment for mobile vehicles also develop various electronic equipment applicable to mobile vehicles. Each year, huge profits are generated.

Accordingly, nowadays, a mobile vehicle generally includes one or more electronic devices. Users can turn on or off the installed electronic devices according to current usage scenario. For example, while driving a mobile vehicle to a familiar destination, the driver can turn off GPS navigation; while heading for an unfamiliar place, the driver can turn on GPS navigation and play music. Unfortunately, as the number of electronic equipment in a mobile vehicle increases, the driver needs to operate more electronic devices concurrently. In addition, the driver is also supposed to operate those basic electronic apparatuses such as the windshield wiper, lamps, and windows. Consequently, the driver might be too busy to drive securely.

To solve the problems, some manufacturers further integrate the devices in a mobile vehicle. The driver can operate the devices integrated to the system through a touch screen in the car. Thereby, most devices in the mobile vehicle can be operated by the driver. Nonetheless, the screen of such an integrated system is normally disposed one the side of the driver. Once the driver needs to operate devices, he/she certainly needs to move away his/her sight temporarily. Consequently, this method still might lead to concerns for driving safety.

SUMMARY

An objective of the present invention is to provide a gesture operation method based on depth values. After acquiring stereoscopic images, an algorithm is performed to recognize if command gestures are contained in the stereoscopic images. Then the corresponding operations of the command gesture can be performed.

In order to achieve the above objective and efficacy, according to an embodiment of the present invention, a gesture operation method based on depth values is disclosed and applicable to mobile vehicles. The method comprises steps of acquiring a first stereoscopic image; recognizing if a plurality of depth values of the first stereoscopic image includes a triggering gesture by performing a first algorithm; acquiring a second stereoscopic image; recognizing if a plurality of depth values of the second stereoscopic image includes a command gesture by performing a second algorithm; and a processing unit performing the corresponding operation of the command gesture.

According to an embodiment of the present invention, a clustering algorithm is adopted to recognize the location of the triggering gesture in the mobile vehicle. The processing unit judges if performing the corresponding operation of the command gesture is permitted according to the location of the triggering gesture in the mobile vehicle. If so, the processing unit performs the correspond operation of the command gesture.

According to an embodiment of the present invention, a first camera unit acquires a first image and a second camera unit acquires a second image. A processing unit obtains a first stereoscopic image according to the first image, the second image, and the included angle.

According to an embodiment of the present invention, a first camera unit acquires a third image and a second camera unit acquires a fourth image. A processing unit acquires a second stereoscopic image according to the third image, the fourth image, and the included angle.

According to an embodiment of the present invention, a structured-light projecting module projects a plurality of light planes continuously. A structured-light camera unit receives a plurality of light pattern messages and calculates to obtain a first stereoscopic image or a second stereoscopic image according to the light pattern messages.

According to an embodiment of the present invention, a first camera unit acquires a first image and a second camera unit acquires a second image. A processing unit obtains a first stereoscopic image according to the first image, the second image, and the included angle. A processing unit judges if the number of the plurality of depth values of the first stereoscopic image is smaller than a threshold value. If so, a structured-light projecting module projects a plurality of light planes continuously. A structured-light camera unit receives a plurality of light pattern messages and calculates to obtain a third stereoscopic image according to the plurality of light pattern messages. The processing unit combines the first stereoscopic image and the third stereoscopic image to form a combined first stereoscopic image.

According to an embodiment of the present invention, a first camera unit acquires a third image and a second camera unit acquires a fourth image. A processing unit obtains a second stereoscopic image according to the third image, the fourth image, and the included angle. A processing unit judges if the number of the plurality of depth values of the second stereoscopic image is smaller than a threshold value. If so, a structured-light projecting module projects a plurality of light planes continuously. A structured-light camera unit receives a plurality of light pattern messages and calculates to obtain a fourth stereoscopic image according to the plurality of light pattern messages. The processing unit combines the second stereoscopic image and the fourth stereoscopic image to form a combined second stereoscopic image.

According to an embodiment of the present invention, a structured-light projecting module projects a plurality of light planes continuously. A structured-light camera unit receives a plurality of light pattern messages and calculates to obtain a first stereoscopic image according to the plurality of light pattern messages. A processing unit judges if the number of the plurality of depth values of the first stereoscopic image is smaller than a threshold value. If so, a first camera unit acquires a first image and a second camera unit acquires a second image. The processing unit obtains a third stereoscopic image according to the first image, the second image, and the included angle. In addition, the processing unit combines the first stereoscopic image and the third stereoscopic image to form a combined first stereoscopic image.

According to an embodiment of the present invention, a structured-light projecting module projects a plurality of light planes continuously. A structured-light camera unit receives a plurality of light pattern messages and calculates to obtain a second stereoscopic image according to the plurality of light pattern messages. A processing unit judges if the number of the plurality of depth values of the second stereoscopic image is smaller than a threshold value. If so, a first camera unit acquires a third image and a second camera unit acquires a fourth image. The processing unit obtains a fourth stereoscopic image according to the third image, the fourth image, and the included angle. In addition, the processing unit combines the second stereoscopic image and the fourth stereoscopic image to form a combined second stereoscopic image.

Moreover, the present invention further provides a gesture operation system based on depth values. The system comprises a stereoscopic-image camera module and a processing unit. The stereoscopic-image camera module acquires a first stereoscopic image and a second stereoscopic image. The processing unit performs a first algorithm to recognize if a plurality of depth values of the first stereoscopic image include a triggering gesture, and performs a second algorithm to recognize if a plurality of depth values of the second stereoscopic image include a command gesture. Then, the processing unit performs the operation corresponding to the command gesture.

DETAILED DESCRIPTION

In order to make the structure and characteristics as well as the effectiveness of the present invention to be further understood and recognized, the detailed description of the present invention is provided as follows along with embodiments and accompanying figures.

According to the prior art, when a driver operates the equipment installed in a mobile vehicle, the driving safety is affected because he needs to move away his line of sight frequently and temporarily or there are too many devices to be operated. Accordingly, the present invention provides a gesture operation method.

Figure 1:
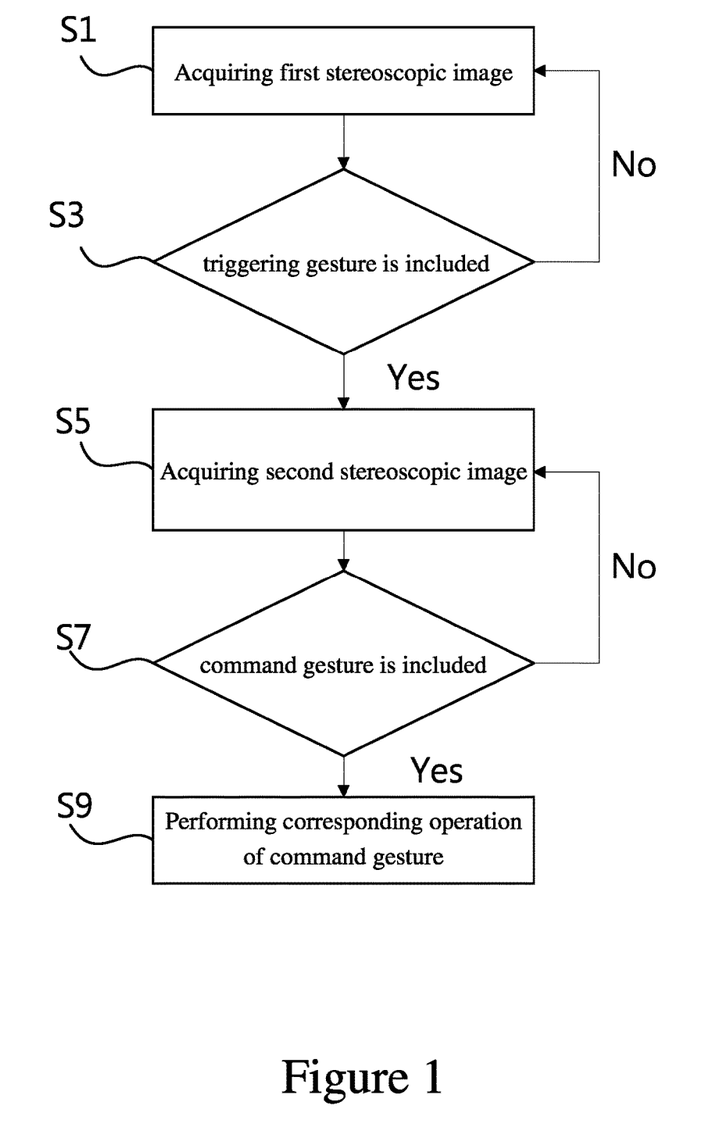
FIG. 1 shows a flowchart of the gesture operation method based on depth values according to the first embodiment of the present invention.

In the following, the flow of the gesture operation method based on depth values according to the first embodiment of the present invention will be described. Please refer to FIG. 1, which shows a flowchart of the gesture operation method based on depth values according to the first embodiment of the present invention. As shown in the figure, the gesture operation method based on depth values according to the present embodiment comprises steps of:

Step S1: Acquiring a first stereoscopic image;
Step S3: Recognizing if a triggering gesture is included;
Step S5: Acquiring a second stereoscopic image;
Step S7: Recognizing if a command gesture is included; and
Step S9: Performing the corresponding operation of the command gesture.

In the following, the system required to implement the gesture operation method based on depth values according to the present invention will be described. Please refer to FIG. 2A, which shows a system schematic diagram of the gesture operation method based on depth values according to the first embodiment of the present invention. As shown in the figure, the system for the gesture operation method based on depth values according to the present invention comprises a gesture control system 1, which comprises a stereoscopic-image camera module 10 and a processing unit 30.

Figure 2A:
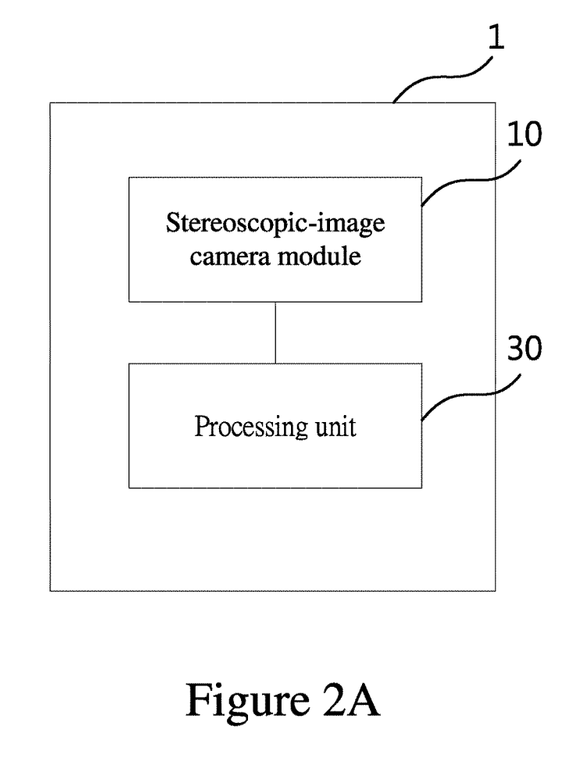
FIG. 2A shows a system schematic diagram of the gesture operation method based on depth values according to the first embodiment of the present invention.

The above gesture control system 1 is disposed in a mobile vehicle so that that the stereoscopic-image camera module 10 photographs the interior of the mobile vehicle. In other words, the stereoscopic-image camera module 10 is disposed at a location capable of photographing the driver space or/and the passenger space. The mobile vehicle can include a car, a truck, a bus, an electric car, or others.

Figure 2B:
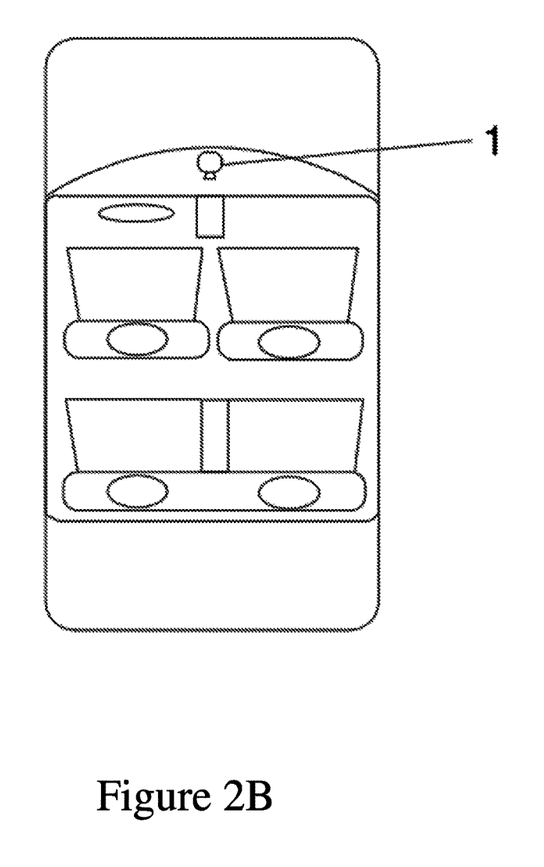
FIG. 2B shows a system schematic diagram of the gesture operation method based on depth values according to the first embodiment of the present invention for illustrating that the stereoscopic-image camera module is disposed in a mobile vehicle.

As shown in FIG. 2B, according to a preferred embodiment of the present invention, the stereoscopic-image camera module 10 is disposed in the mobile vehicle such that the stereoscopic-image camera module is able to photograph the interior of the mobile vehicle.

Figure 3:
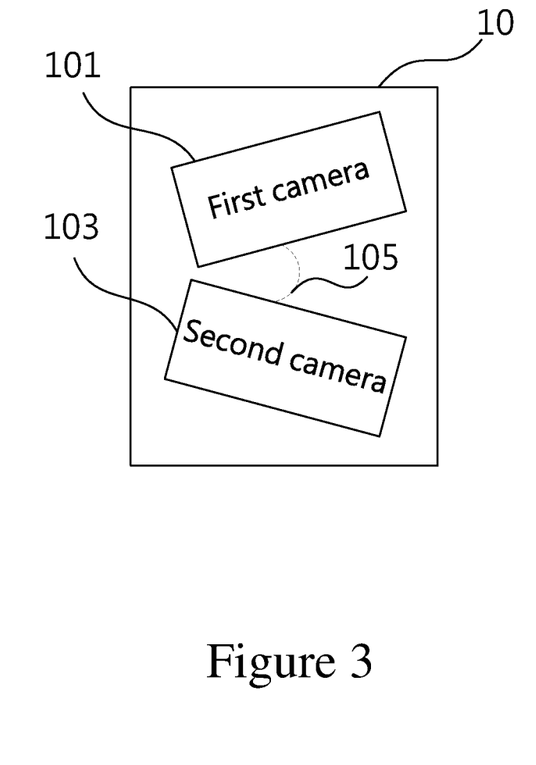
FIG. 3 shows a schematic diagram of the stereoscopic-image camera module in the gesture operation method based on depth values according to the first embodiment of the present invention.

As shown in FIG. 3, the above stereoscopic-image camera module 10 includes a first camera unit 101 and a second camera unit 103. An included angle 105 is formed between the first camera unit 101 and the second camera unit 103.

The above processing unit 30 is an electronic component capable of performing arithmetic, logic, and image operations.

In the following, the flow of the gesture operation method based on depth values according to the first embodiment of the present invention will be described. Please refer to FIGS.

1 to 3. While operating the electronic device disposed in the mobile vehicle, the steps S1 through S9 will be performed.

In the step S1 of acquiring a first stereoscopic image, the first camera unit 101 acquires a first image and the second camera unit 103 acquires a second image. The processing unit 30 performs an operation to obtain a first stereoscopic image according to the first image, the second image, and the included angle 105.

In the step S3 of recognizing if a triggering gesture is included, the processing unit 30 performs a first algorithm to recognize if a triggering gesture is included in a plurality of depth values of the first stereoscopic image. If so, the step S5 is performed; otherwise, return to the step S1. The first algorithm is a gesture recognition algorithm. Namely, the processing unit 30 uses the gesture recognition algorithm to recognize if a triggering gesture is included in the first stereoscopic image according to the depth values (the Z values) of a plurality of pixels in the first stereoscopic image.

In the step S5 of acquiring a second stereoscopic image, the first camera unit 101 acquires a third image and the second camera unit 103 acquires a fourth image. The processing unit 30 performs an operation to obtain a second stereoscopic image according to the third image, the fourth image, and the included angle 105.

In the step S7 of recognizing if a command gesture is included, the processing unit 30 performs a second algorithm to recognize if a command gesture is included in a plurality of depth values of the second stereoscopic image. If so, the step S9 is performed; otherwise, return to the step S5. The second algorithm is a gesture recognition algorithm. Namely, the processing unit 30 uses the gesture recognition algorithm to recognize if a command gesture is included in the second stereoscopic image according to the depth values (the Z values) of a plurality of pixels in the second stereoscopic image.

In the step S9 of performing the corresponding operation of the command gesture, the processing unit 30 performs the corresponding operation of the command gesture after recognizing the command gesture. For example, as the command gesture is to turn on the GPS, the processing unit 30 turns on the GPS; as the command gesture is turn on the audio equipment, the processing unit 30 turns on the audio equipment.

Then, the gesture operation method based on depth values according to the first embodiment of the present invention is completed. Compared to the gesture recognition methods using plane images, the present invention performs gesture recognition using stereoscopic images can acquire the outlines of hands more precisely and thus achieving more accurate recognition performance.

In addition, while recognizing gestures using plane images, the user's hands are limited to planar movements, namely, up, down, left, and right movements. Contrarily, while performing gesture recognition using the depth values of stereoscopic images, the three-dimensional movements, namely, forward, backward, up, down, left, and right movements, of the user's hands can be further recognized. Thereby, the user can record more gestures in the gesture operation system 1 for achieving the purpose of operating one or more devices disposed in the mobile vehicle.

Furthermore, according to the present invention, before recognizing the command gesture, the triggering gesture will be recognized first. The user should perform the triggering gesture first and the gesture operation system 1 can recognize the triggering gesture. Thereby, once the user waves his hands unintentionally, false operations by the gesture operation system 1 can be prevented.

In the following, the gesture operation method based on depth values according to the second embodiment of the present invention will be described. Please refer to FIG. 4, which shows the system required for the gesture operation method based on depth values according to the second embodiment of the present invention. The difference between the present embodiment and the first one is that the gesture operation system 1 according to the present embodiment comprises a structured-light projecting module 107 and a structured-light camera unit 109. The rest are the same as the first embodiment. Hence, the details will not be described again.

Figure 4:
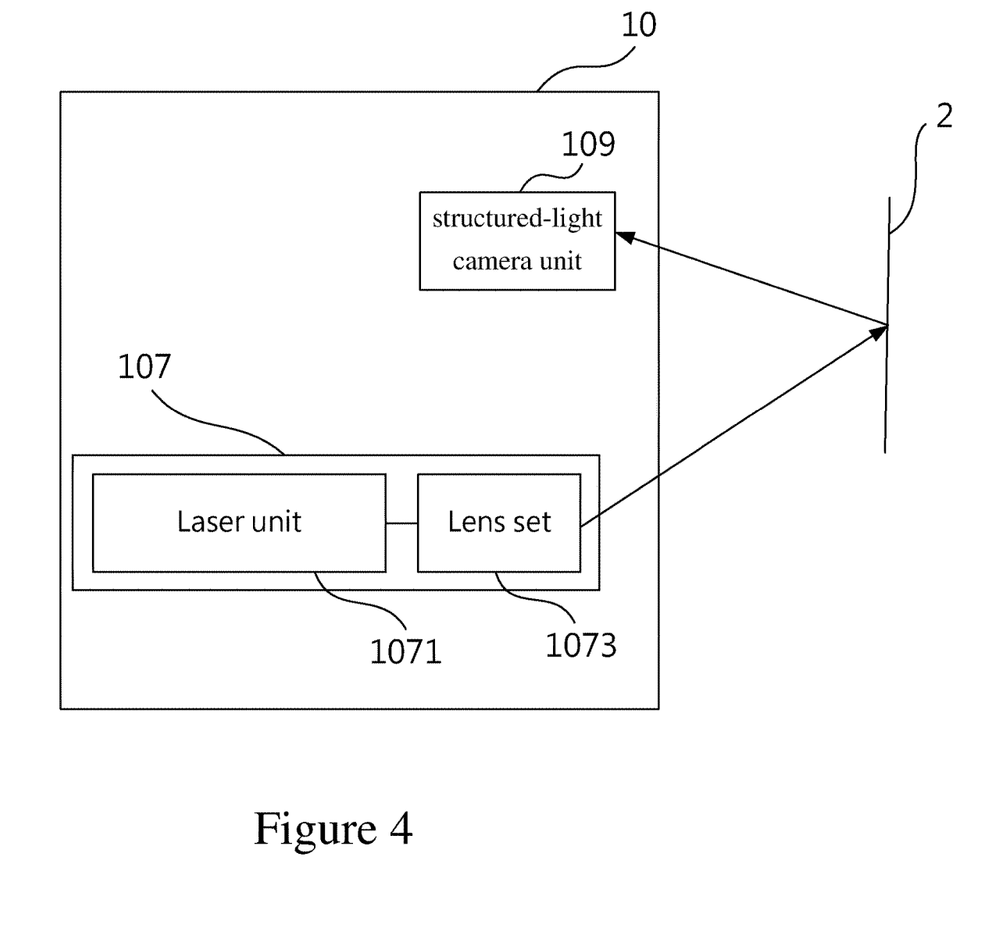
FIG. 4 shows a schematic diagram of the stereoscopic-image camera module in the gesture operation method based on depth values according to the second embodiment of the present invention.
Figure 5:
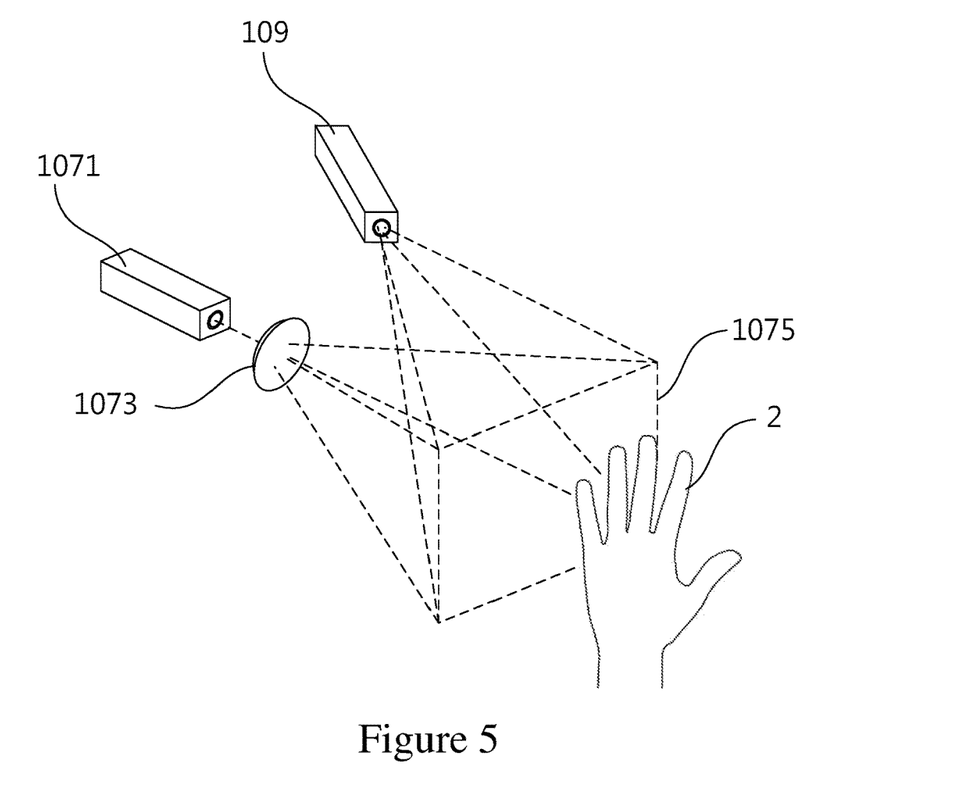
FIG. 5 shows a schematic diagram of the gesture operation method based on depth values according to the second embodiment of the present invention for illustrating projection of a light plane on an object.
Figure 6:
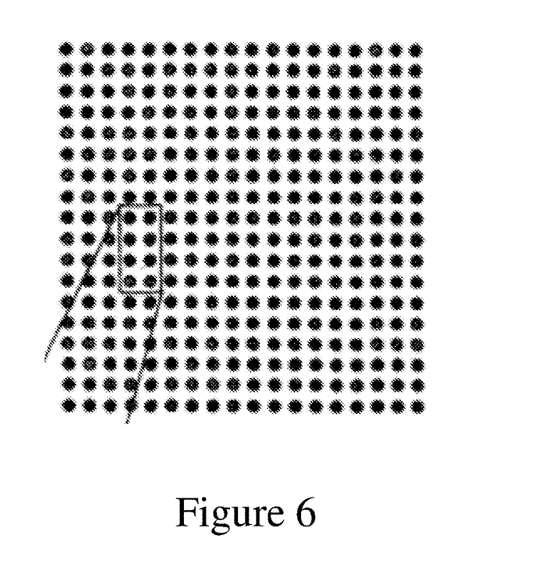
FIG. 6 shows a schematic diagram of the two-dimensional dot matrix contained in the light plane in the gesture operation method based on depth values according to the second embodiment of the present invention

The structured-light projecting module 17 includes a laser unit 1071 and a lens set 1073. As shown in FIG. 5, the structured light source projects controllable light spots, light stripes, or light planes to the surface of an object 2. Then a sensor such as a camera acquires the reflected image. After geometric operations, the stereoscopic image of the object will be obtained. According to an embodiment of the present invention, the invisible laser is adopted as the light source for its excellent coherence, slow attenuation, long measurement distance, and high accuracy. In addition, laser is less influenced by other light sources and hence preferred to normal light. The laser provided by the laser unit 1071 spreads after passing the lens set 1073 and forming a light plane 1075 in space. The lens set 1073 adopted by the present invention can include a patterns lens, which includes patterned microstructures and hence enabling the light plane formed by the penetrating laser to have patterned features, such as the two-dimensional light-dot matrix shown in FIG. 6.

According to the present embodiment, in the steps S1 and S5, the structured-light projecting module 107 projects a plurality of light planes 1075 continuously to the surface of the one or more object 2 in the mobile vehicle. Then the structured-light camera unit 10 acquires a plurality of light pattern messages reflected from the surface of the object 2 after projecting the light planes 1075. The processing unit 30 calculates according to the received plurality of light pattern messages to obtain the first stereoscopic image and the second stereoscopic image.

According to another embodiment of the present invention, the projection distance of the laser can be further increased or reduced by adjusting the power of the laser unit 1071. For example, the power of the laser unit 1071 can be increased in an open space and reduced in a crowded space.

According to the gesture operation method based on depth values according to the second embodiment of the present invention, because the structured-light projecting module 107 can project structured light spontaneously to the surrounding object 2, the method can be applied to a dark or dim environment.

In the following, the gesture operation method based on depth values according to the third embodiment of the present invention will be described. Please refer to FIG. 7. The difference between the present embodiment and the first one is that the method according to the present embodiment further comprises steps S4 and S8. The rest are the same as the first embodiment. Hence, the details will not be described again.

Figure 7:
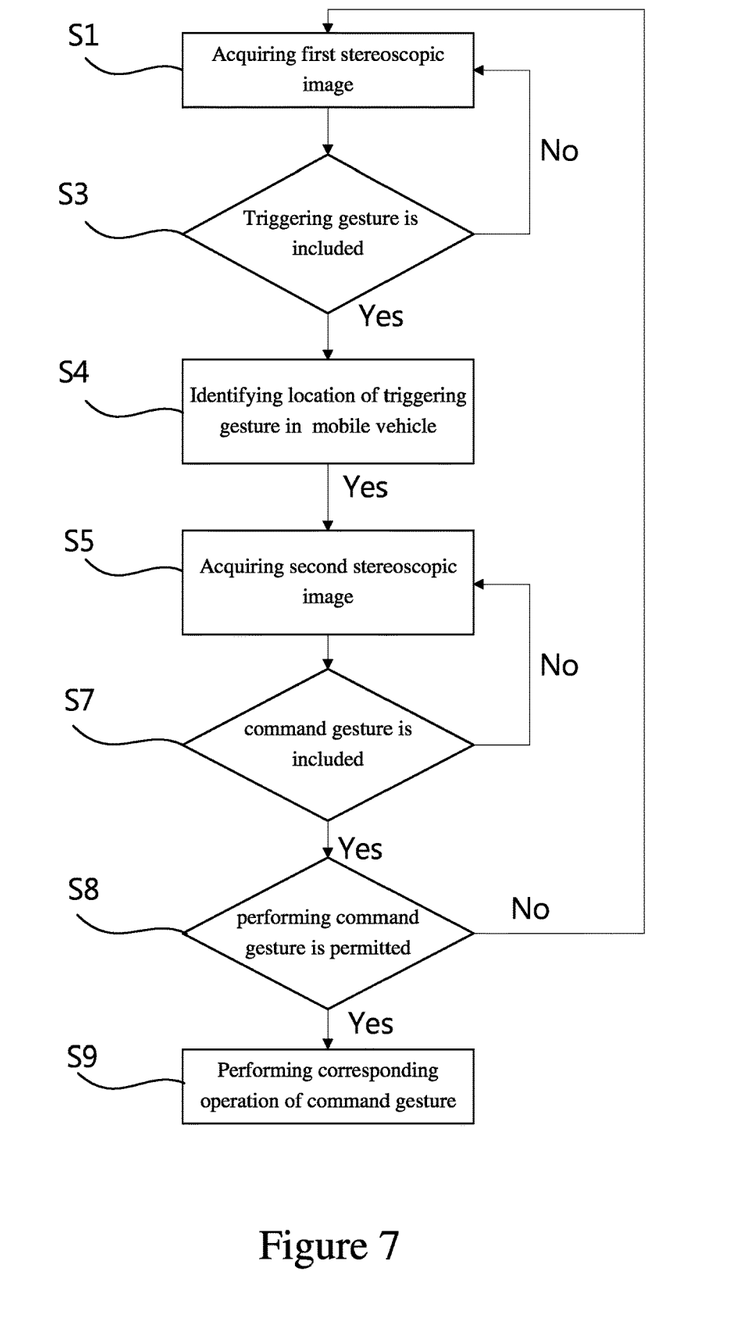
FIG. 7 shows a flowchart of the gesture operation method based on depth values according to the third embodiment of the present invention.

In the step S4 of identifying the location of the triggering gesture in the mobile vehicle, the processing 30 performs a clustering algorithm to identify the location of the triggering gesture in the mobile vehicle. In other words, the processing unit 30 performs the clustering algorithm to identify the location of the user performing the triggering gesture in the mobile vehicle. For example, the user performing the triggering gesture is located at the driver's seat, the shotgun seat, or the back seat.

According to an embodiment of the present invention, after identifying the location of the user performing the triggering gesture in the mobile vehicle, the user's identification can be further acquired. For example, the user located at the driver's seat is the driver; the user located at the shotgun seat is the co-driver or the passenger; or the one located at the back seat is the passenger.

According to an embodiment of the present invention, the clustering algorithm is the K-means clustering algorithm or other algorithms capable of clustering objects.

In the step S8 of judging if performing the command gesture is permitted, the processing unit 30 judges if performing the corresponding operation of the command gesture is permitted according to the location of the triggering gesture in the mobile vehicle. In other words, the processing unit 30 will judge whether the corresponding operation of the command gesture should be performed according to the location of the user performing the triggering gesture.

Then, the gesture operation method based on depth values according to the third embodiment of the present invention is completed. By using the present embodiment, different levels of permission can be granted according to different locations. For example, the driver can own the permission of operating the windshield wiper, the car lamp, and the GPS; the co-driver can have the permission to operate the GPS and the multimedia system; and the passenger is permitted to operate the multimedia system. Thereby, the risk of users' unintentional activation of devices, such as the windshield wiper, that might interfere the driver can be lowered. Hence, the safety of the present invention is enhanced.

Next, the gesture operation method based on depth values according to the fourth embodiment of the present invention will be described. Please refer to FIG. 8 and FIG. 9, which show a flowchart of the step S1 further including the steps S101 to S105 and a system schematic diagram of the gesture operation method based on depth values according to the fourth embodiment of the present invention. The difference between the present embodiment and the first one is that, according to the present embodiment, the steps S101 to S105 are further included after the step S1. The gesture operation system 1 comprises a first camera unit 101, a second camera unit 103, a structured-light projecting module 107, and a structured-light camera unit 109.

Figure 8:
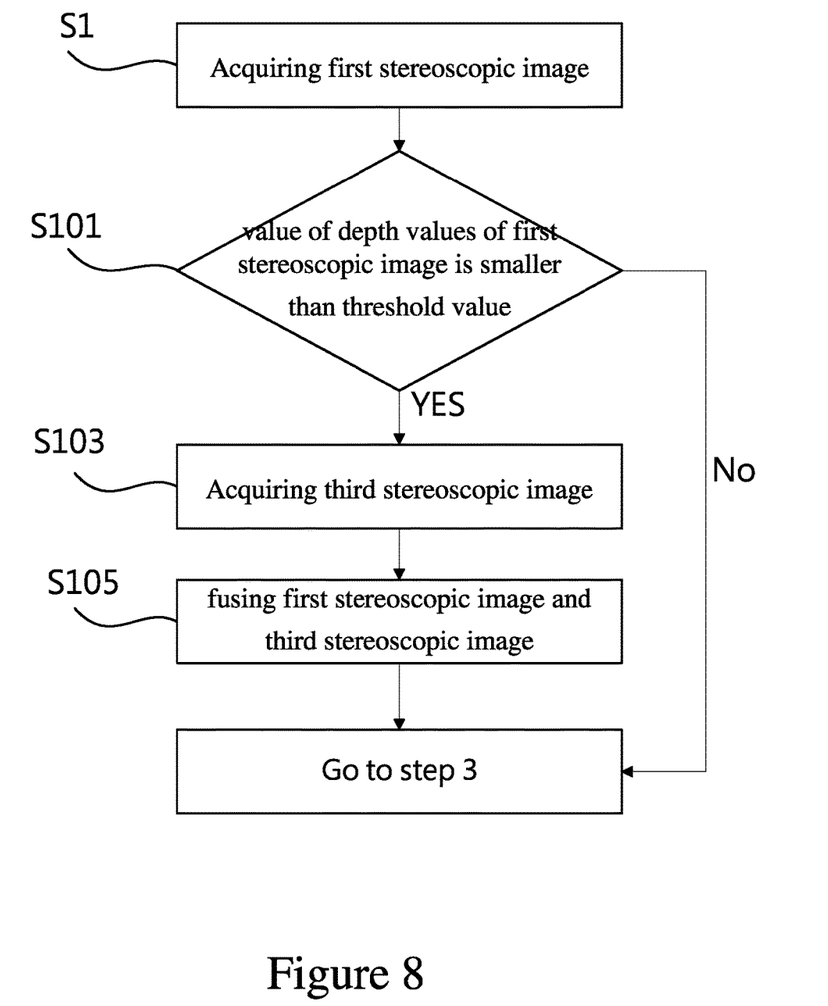
FIG. 8 shows a flowchart of the step S1 in the gesture operation method based on depth values according to the fourth embodiment of the present invention.
Figure 9:
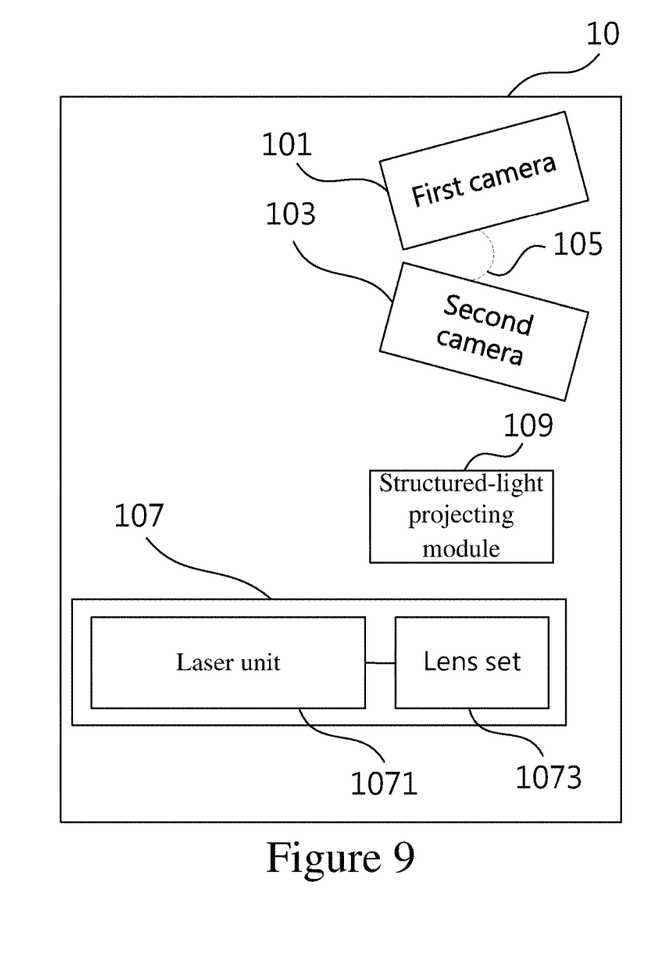
FIG. 9 shows a system schematic diagram of the gesture operation method based on depth values according to the fourth embodiment of the present invention.

In the step S1 of acquiring a first stereoscopic image, the first camera unit 101 acquires a first image and the second camera unit 103 acquires a second image. The processing unit 30 performs an operation to obtain a first stereoscopic image according to the first image, the second image, and the included angle 105.

In the step S101 of judging if the value of depth values of the first stereoscopic image is smaller than a threshold value, the processing unit 30 performs the judgment. If so, the step S103 is executed; otherwise, go to the step S3. In other words, the processing unit 30 scans the pixels of the first stereoscopic image and gathers statistics of the number of pixels including depth values for giving the number of depth values. Then the processing unit 30 judges if the number of depth values is smaller than a threshold value.

In the step S103 of acquiring a third stereoscopic image, the structured-light projecting module 107 projects a plurality of light planes 1075 continuously to the surface of the one or more object 2 in the mobile vehicle. Then the structured-light camera unit 109 acquires a plurality of light pattern messages reflected from the surface of the object 2 after projecting the light planes 1075. The processing unit 30 calculates according to the received plurality of light pattern messages to obtain the third stereoscopic image.

In the step S105 of fusing the first stereoscopic image and the third stereoscopic image, the processing unit 30 performs the fusion according to an image fusion algorithm to obtain a fused first stereoscopic image.

Afterwards, in the step S3, the processing judges if the fused first stereoscopic image includes the triggering gesture according to a first algorithm.

According to the present embodiment, while executing the step S1, the first stereoscopic image can be also acquired by using the structured-light projecting module 107 and the structured-light camera unit 109. In this case, in the step S103, the processing unit 30 performs an operation to obtain the third stereoscopic image according to the first image acquired by the first camera unit 101, the second image acquired by the second camera unit 103, and the included angle 105.

Because the first and second images taken by the first and second camera units 101, 103 in a dim place may appear partially or fully dark, the calculated first stereoscopic image may include no depth value in some pixels. In addition, the light pattern messages in the first stereoscopic image acquired by the structured-light projecting module 107 and the structured-light camera unit 109 in a bright environment will be incomplete owing to interference of light. In this condition, the obtained first stereoscopic image may include no depth value in some pixels. If the pixels containing no depth value in the first stereoscopic image is excessive, it is difficult for the first algorithm to recognize if the first stereoscopic image includes the triggering gesture. According to the present embodiment, once the number of depth values in the first stereoscopic image is judged to be smaller than a threshold value, the third stereoscopic image is further acquired and fused with the first stereoscopic image. The produced fused first stereoscopic image will contain sufficient number of the depth values for facilitating the first algorithm to recognize if the fused first stereoscopic image includes the triggering gesture.

According to an embodiment of the present embodiment, the threshold value is 50% of the total number of pixels of the first stereoscopic image. In other words, when the first stereoscopic image contains 1000 pixels, the threshold value is 500.

Next, the gesture operation method based on depth values according to the fifth embodiment of the present invention will be described. Please refer to FIG. 10, which shows a flowchart of the step S5 further including the steps S501 to S505 in the gesture operation method based on depth values according to the fifth embodiment of the present invention. The difference between the present embodiment and the first one is that, according to the present embodiment, the steps S501 to S505 are further included after the step S5. The required system according to the present embodiment is identical to the one according to the fourth embodiment. Please refer to FIG. 9. The gesture operation system 1 comprises a first camera unit 101, a second camera unit 103, a structured-light projecting module 107, and a structured-light camera unit 109.

Figure 10:
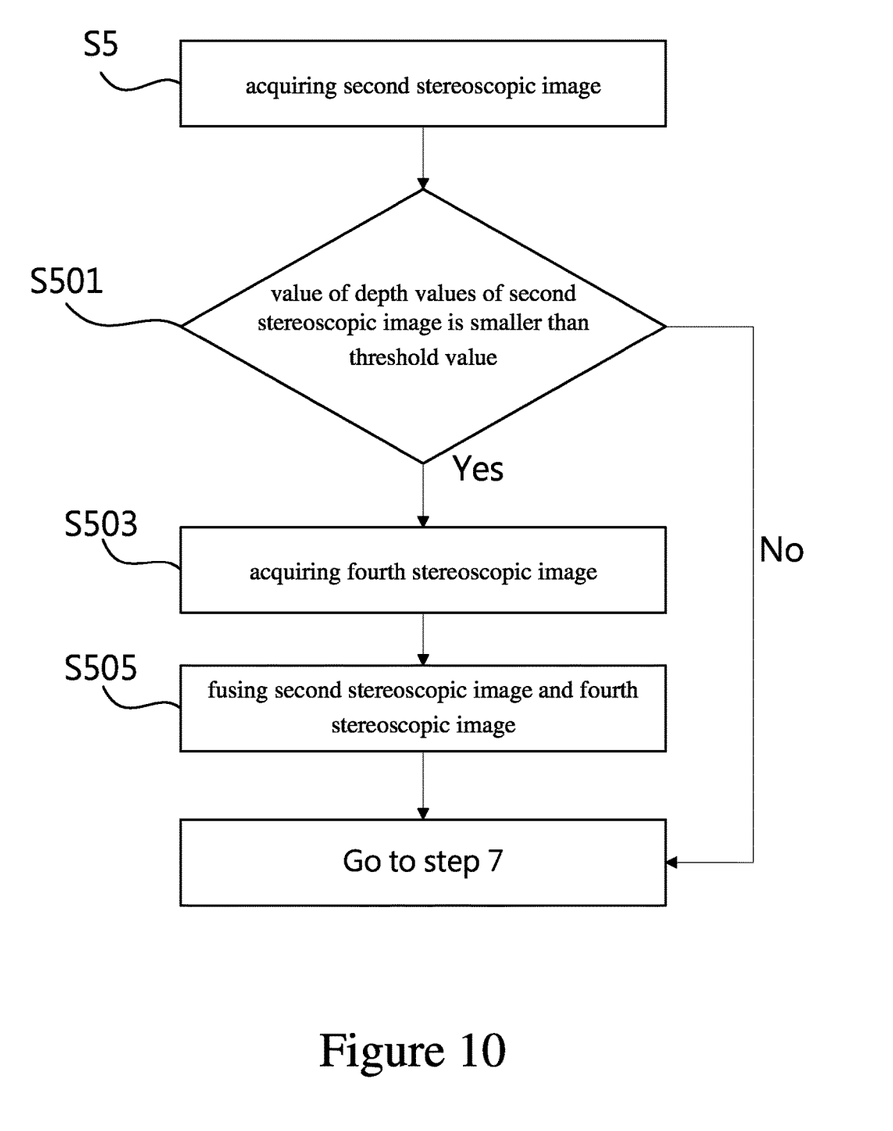
FIG. 10 shows a flowchart of the step S5 in the gesture operation method based on depth values according to the fifth embodiment of the present invention.

In the step S5 of acquiring a second stereoscopic image, the first camera unit 101 acquires a third image and the second camera unit 103 acquires a fourth image. The processing unit 30 performs an operation to obtain a second stereoscopic image according to the third image, the fourth image, and the included angle 105.

In the step S101 of judging if the value of depth values of the second stereoscopic image is smaller than a threshold value, the processing unit 30 performs the judgment. If so, the step S503 is executed; otherwise, go to the step S7. In other words, the processing unit 30 scans the pixels of the second stereoscopic image and gathers statistics of the number of pixels including depth values for giving the number of depth values. Then the processing unit 30 judges if the number of depth values is smaller than a threshold value.

In the step S53 of acquiring a fourth stereoscopic image, the structured-light projecting module 107 projects a plurality of light planes 1075 continuously to the surface of the one or more object 2 in the mobile vehicle. Then the structured-light camera unit 109 acquires a plurality of light pattern messages reflected from the surface of the object 2 after projecting the light planes 1075. The processing unit 30 calculates according to the received plurality of light pattern messages to obtain the fourth stereoscopic image.

In the step S505 of fusing the second stereoscopic image and the fourth stereoscopic image, the processing unit 30 performs the fusion according to an image fusion algorithm to obtain a fused second stereoscopic image.

Afterwards, in the step S7, the processing judges if the fused second stereoscopic image includes the triggering gesture according to a second algorithm.

According to the present embodiment, while executing the step S5, the second stereoscopic image can be also acquired by using the structured-light projecting module 107 and the structured-light camera unit 109. In this case, in the step S503, the processing unit 30 performs an operation to obtain the fourth stereoscopic image according to the third image acquired by the first camera unit 101, the fourth image acquired by the second camera unit 103, and the included angle 105.

According to an embodiment of the present embodiment, the threshold value is 50% of the total number of pixels of the first stereoscopic image. In other words, when the second stereoscopic image contains 1000 pixels, the threshold value is 500.

According to an embodiment of the present embodiment, the first stereoscopic image can be continuous images, representing the continuous gestures of the triggering gesture. In the step S3, the processing unit 30 performs the first algorithm and the hidden Markov model (HMM) to recognize if the first stereoscopic image includes the triggering gesture.

According to an embodiment of the present embodiment, the first stereoscopic image can be continuous images, representing the continuous gestures of the triggering gesture. In the step S3, the processing unit 30 performs the first algorithm and the hidden Markov model (HMM) to recognize if the first stereoscopic image includes the triggering gesture.

According to an embodiment of the present embodiment, the plurality of light pattern messages are formed by reflecting the plurality of light planes from one or more object.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A gesture operation method based on depth values, applied in a mobile vehicle, wherein said mobile vehicle comprises a stereoscopic-image camera module which comprises a first camera unit, a second camera unit, a structured-light projecting module, and a structured-light camera unit; and wherein an included angle is formed between said first camera unit and said second camera unit, comprising steps of:
  acquiring a first image by said first camera unit;
  acquiring a second image by said second camera unit;
  acquiring a first stereoscopic image by performing a processing unit from said first image, said second image, and said included angle;
  recognizing if a plurality of first depth values of said first stereoscopic image includes a triggering gesture by performing a first algorithm;
  judging if a number of said plurality of first depth values is smaller than a first threshold value;
  projecting a plurality of light planes continuously from said structured-light projecting module as the number of said first depth values is smaller than said first threshold value;
  receiving a plurality of first light pattern messages from said structured-light camera unit;
  obtaining a third stereoscopic image by calculating from said plurality of first light pattern messages;
  fusing said first stereoscopic image and said third stereoscopic image to form a fused first stereoscopic image;
  acquiring a third image by said first camera unit;
  acquiring a fourth image by said second camera unit;
  acquiring a second stereoscopic image by performing said processing unit from said third image, said fourth image, and said included angle;
  recognizing if a plurality of second depth values of said second stereoscopic image includes a command gesture by performing a second algorithm;
  judging if a number of the plurality of second depth values is smaller than a second threshold value;
  projecting a plurality of light planes continuously from the structured-light projecting module as the number of the second depth values is smaller than the second threshold value;
  receiving a plurality of second light pattern messages from the structured-light camera unit;
  obtaining a fourth stereoscopic image by calculating from the plurality of second light pattern messages;
  fusing the second stereoscopic image and the fourth stereoscopic image to form a fused second stereoscopic image; and
  performing the processing unit corresponding to an operation of the command gesture.

2. The gesture operation method based on depth values of claim 1, further comprising steps of:
  identifying a location of said triggering gesture in said mobile vehicle using a clustering algorithm;
  said processing unit judging if performing said corresponding operation of said command gesture is permitted according to said location of said triggering gesture in said mobile vehicle; and
  said processing unit performing said corresponding operation of said command gesture if permitted.

3. The gesture operation method based on depth values of claim 1, wherein said mobile vehicle includes a stereoscopic-image camera module; said stereoscopic-image camera module includes a first camera unit and a second camera unit; and an included angle is formed between said first camera unit and said second camera unit, and the method further comprising steps of:

said first camera unit acquiring a first image;

said second camera unit acquiring a second image; and said processing unit giving said first stereoscopic image according to said first image, said second image, and said included angle.

4. The gesture operation method based on depth values of claim 1, wherein said mobile vehicle includes a stereoscopic-image camera module; said stereoscopic-image camera module includes a first camera unit and a second camera unit; and an included angle is formed between said first camera unit and said second camera unit, and the method further comprising steps of:

said first camera unit acquiring a third image;

said second camera unit acquiring a fourth image; and said processing unit giving said second stereoscopic image according to said third image, said fourth image, and said included angle.

5. The gesture operation method based on depth values of claim 1, wherein said mobile vehicle includes a stereoscopic-image camera module; said stereoscopic-image camera module includes a structured-light projecting module and a structured-light camera unit, and the method further comprising steps of:

said structured-light projecting module projecting a plurality of light planes continuously;

said structured-light camera unit receiving a plurality of light pattern messages; and calculating according to said plurality of light pattern messages to obtain said first stereoscopic image or said second stereoscopic image.

6. A gesture operation system based on depth values for a mobile vehicle, comprising:

a stereoscopic-image camera module comprising a first camera unit, a second camera unit, a structured-light projecting module, and a structured-light camera unit, wherein an included angle is formed between said first camera unit and said second camera unit; and a processing unit, obtaining a first stereoscopic image according to a first image acquired by said first camera unit, a second image acquired by said second camera unit, and said included angle, obtaining a second stereoscopic image according to a third image acquired by said first camera unit, a fourth image acquired by said second camera unit, and said included angle, and recognizing if a plurality of depth values of said first stereoscopic image includes a triggering gesture by performing a first algorithm and recognizing if a plurality of depth values of said second stereoscopic image includes a command gesture by performing a second algorithm;

wherein said processing unit judges if said number of said plurality of depth values of said first stereoscopic image is smaller than a threshold value; said structured-light projecting module projects a plurality of light planes continuously if said number of said plurality of depth values of said first stereoscopic image is smaller than said threshold value; said structured-light camera unit receives a plurality of light pattern messages; said processing unit calculates according to said plurality of light pattern messages to obtain a third stereoscopic image; and said processing unit fuses said first stereoscopic image and said third stereoscopic image to form a fused first stereoscopic image; further, said processing unit judges if said number of said plurality of depth values of said second stereoscopic image is smaller than a threshold value; said structured-light projecting module projects a plurality of light planes continuously if said number of said plurality of depth values of said first stereoscopic image is smaller than said threshold value; the structured-light camera unit receives a plurality of light pattern messages; said processing unit calculates according to said plurality of light pattern messages to obtain a fourth stereoscopic image; and the processing unit fuses the second stereoscopic image and the fourth stereoscopic image to form a fused second stereoscopic image; and wherein the processing unit is corresponded to an operation of said command gesture.

7. The gesture operation system based on depth values of claim 6, wherein said processing unit identifies a location of said triggering gesture in said mobile vehicle by performing a clustering algorithm and judges if performing said corresponding operation of said command gesture is permitted according to said location of said triggering gesture in said mobile vehicle; and if permitted, said processing unit performs said corresponding operation of said command gesture.

8. The gesture operation system based on depth values of claim 6, wherein said stereoscopic-image camera module includes a first camera unit and a second camera unit; an included angle is formed between said first camera unit and said second camera unit; and said processing unit obtains said first stereoscopic image according to a first image acquired by said first camera unit, a second image acquired by said second camera unit, and said included angle.

9. The gesture operation system based on depth values of claim 6, wherein said stereoscopic-image camera module includes a first camera unit and a second camera unit; an included angle is formed between said first camera unit and said second camera unit; and said processing unit obtains said second stereoscopic image according to a third image acquired by said first camera unit, a fourth image acquired by said second camera unit, and said included angle.

10. The gesture operation system based on depth values of claim 6, wherein said stereoscopic-image camera module includes a structured-light projecting module and a structured-light camera unit; said structured-light projecting module projects a plurality of light planes continuously; said structured-light camera unit receives a plurality of light pattern messages; and said processing unit calculates according to said plurality of light pattern messages to obtain said first stereoscopic image or said second stereoscopic image.

* * * * *